United States Patent Office 3,640,997
Patented Feb. 8, 1972

3,640,997
SUCROSE-ETHYLENE DIAMINE POLYOLS AND
PROCESS FOR PREPARING SAME
Walter R. Fijal, Trenton, Mich., assignor to BASF
Wyandotte Corporation, Wyandotte, Mich.
No Drawing. Continuation-in-part of application Ser. No.
605,178, Dec. 28, 1966. This application May 7, 1969,
Ser. No. 822,702
Int. Cl. C07c 47/18
U.S. Cl. 260—209 R                    10 Claims

ABSTRACT OF THE DISCLOSURE

A sucrose-ethylene diamine polyol is prepared by reacting a mixture of sucrose and ethylene diamine with an alkylene oxide in the presence of a caustic catalyst. The polyol is used to prepare polyurethane foam products having excellent dimensional stability and physical properties. The polyurethane foams are used in preparing molded articles and as insulation for refrigerators, freezers, and the like.

This application is a continuation-in-part of copending application Ser. No. 605,178, filed Dec. 28, 1966, now abandoned.

This invention relates to a cross-linking polyol for use in making cellular polyurethane plastic materials. In a more particular aspect, this invention relates to a sucrose-ethylene diamine polyol useful in preparing polyurethane foam products.

Various cross-linking agents such as polyoxyalkylene glycols, 1,2,3-tris(2-hydroxypropyl) glycerol, octakis (2-hydroxylpropyl) sucrose, and the like polyols, have been employed in the prior art in the production of rigid and semi-rigid polyurethane cellular plastic materials. It has previously been noted that those cross-linking polyols which possess a high functionality, that is, a high number of free hydroxyl groups, can most advantageously be utilized to produce polyurethane cellular products with good density and dimensional stability. In general, it can be said that the higher the functionality of the polyol used, the greater the dimensional stability and rigidity of the cellular polyurethane product produced therewith. It is for this reason that octakis (2-hydroxypropyl) sucrose and other higher molecular weight sucrose polyols, having a hydroxyl functionality of 8, are of great interest in polyurethane foam preparation.

The preparation of octakis (2-hydroxypropyl) sucrose has been described in U.S. Pat. No. 2,902,478 and U.S. Pat. No. 2,927,918. This polyol, however, is extremely hard to utilize in polyurethane foam preparation and has been found to produce a foamed product which is lumpy, of greatly varying cell size, and lacking in dimensional stability. These foam faults can be attributed in general to the viscosity of the octakis (2-hydroxypropyl) sucrose, since at room temperature the sucrose polyol is, for all practical purposes, a solid. Another drawback to the sucrose polyols prepared according to the prior art methods is that in their preparation a certain amount of diol product is generally produced which results in a lowering of the average hydroxyl functionality of the total polyol component of the polyurethane foam system. Thus, about 10% by weight diol may be produced when an appreciable amount of water is present during the polyol preparation.

It has also previously been noted that sucrose polyols, per se, have poor compatibility with the fluorocarbons commonly employed as blowing agents for polyurethane foams. Partly for this compatibility reason and also because of their high viscosity, the sucrose polyols are generally blended with low viscosity polyols, such as glycols, having good compatibility with fluorocarbon blowing agents. This technique of incorporating sucrose polyols into polyurethane foam formulations has the disadvantage of requiring the separate preparation of two individual polyol components, one having a high viscosity and the other a low viscosity, and finally blending the two polyols together. Since octakis (2-hydroxypropyl) sucrose is so viscous as to be practically a solid at room temperature and also sensitive to deterioration at elevated temperatures, considerable care and time are required for the mixing operation if complete blending without damage is to be achieved. Still another disadvantage of this procedure is that the average hydroxyl functionality of the total polyol component of the polyurethane foam formulation is reduced to about 3 to 4 due to this blending.

It is, therefore, a specific object of this invention to prepare a cross-linking sucrose polyol which can be conveniently used to prepare polyurethane foam materials. Another object is to provide a sucrose polyol which has an easily workable viscosity and which is compatible with fluorocarbon blowing agents.

A still further object of this invention is to prepare a cross-linking sucrose polyol which has a hydroxyl functionality of about 5 or greater. Still another object of the invention is to provide a sucrose polyol which can be used as the sole polyol ingredient to prepare polyurethane foam materials having excellent dimensional stability. Further objects and advantages will appear from the detailed description of the invention which follows.

These and the other objects of this invention are accomplished by providing a composition which comprises a polyol product having a hydroxyl functionality of about 5–6.5 and prepared by the reaction of (1) a mixture of one mole of sucrose and about 0.6 to 3 moles of ethylene diamine with (2) at least one mole of an alkylene oxide per reactive hydrogen equivalent in said sucrose and ethylene diamine. The reaction is generally conducted at a temperature of about 80° to 140° C., and in the presence of a critical catalytic amount of catalyst selected from the group consisting of sodium hydroxide and potassium hydroxide. By the term "reactive hydrogen" we mean hydrogen sufficiently active to react with an alkylene oxide, such as propylene oxide, under the reaction conditions used in the process of this invention. Thus, for sucrose which has 8 hydroxyl groups per molecule, there are 8 reactive hydrogens. Ethylene diamine has 2 primary amine groups per molecule, and thus contains 4 reactive hydrogens. The term "mixture" includes solutions, slurries, emulsions, suspensions, and the like physical mixtures of the two materials.

A particular accomplishment and embodiment of this invention is the preparation of novel polyurethane foam products by means of reacting the above-described novel cross-linking polyol product with an organic diisocyanate, in the presence of a blowing agent and a catalyst. The polyurethane foam products of this invention possess enhanced dimensional stability and excellent physical properties.

The cross-linking sucrose polyols of this invention are prepared by a safe, easily controlled reaction which is readily adaptable to continuous operation. The polyols have excellent color and possess an easily workable viscosity of about 10–100 cps. at 110° C. They can be utilized, as illustrated in the examples below, to produce polyurethane foam products having excellent color, uniform cell size, and dimensional stability.

The initial step in preparing the cross-linking polyol is to prepare a mixture of 1 mole of sucrose in about 0.6 to 3.0 moles of ethylene diamine. The preferred ratio is about 1.0/1.0 to 1.0/2.2 moles of sucrose to ethylene diamine. When using this preferred ratio, an optimum hydroxyl functionality of about 5.2 to 6.0 is obtained. When more than 3 moles of ethylene diamine per mole of sucrose is used, there is not enough sucrose present in the polyol product to produce a polyurethane foam having enhanced dimensional stability. Also, at this ratio the hydroxyl functionality of the cross-linking polyol is less than the desired minimum functionality of 5.0. It is also within the contemplation of this invention that an ethylene diamine polyol may be present in an amount up to molar difference between 3.0 and the number of moles of ethylene diamine used per mole of sucrose. When less than 0.6 moles of ethylene diamine are used per mole of sucrose, there is a solubility problem. In this situation all of the sucrose will not completely react with the alkylene oxide so that sucrose will precipitate from the finished polyol product, causing it to become cloudy. When the polyol is used to produce urethane foams the resulting products are friable or brittle, have a non-uniform cell structure, low closed-cell content, poor K factor and objectionable appearance. The limited and selective solubility of sucrose in ethylene diamine is one of the novel features of this invention. It has been determined that sucrose is not soluble in ethylene diamine which has previously been reacted with an alkylene oxide. Sucrose is not soluble in organic diisocyanates or other non-polyol components of the polyurethane foam system, such as fluorocarbon blowing agents. It has also been determined that sucrose dissolved in ethylene diamine cannot be incorporated, as such, into a polyurethane foam formulation. Thus, the sucrose-ethylene diamine mixture which has been converted to a one-component cross-linking polyol by the practice of this invention presents a novel product which may be utilized as the sole polyol ingredient in the polyurethane foam formulation.

The second step in preparing the cross-linking polyol of this invention is to add to the sucrose-ethylene diamine mixture, described above, from about 0.15 to 0.6 weight percent, by weight of sucrose and ethylene diamine mixture, of a catalyst selected from the group consisting of sodium hydroxide and potassium hydroxide. The preferred catalyst concentration is from about 0.2 to 0.4 weight percent. One of the unexpected discoveries of this invention was that, contrary to the typical alkylene oxide condensation reaction, the catalyst concentration should be controlled quite carefully. The surprising feature in this regard was the discovery that there are practical lower and upper limits as to the amount of catalyst that can be used while still obtaining a completely satisfactory product. Thus, when about 0.15 weight percent of the catalyst was employed a suitable product was obtained but the reaction took place at a slower and less practical rate than when the preferred minimum quantity of 0.20 weight percent was utilized. When amounts greater than about 0.6 weight percent were used, it was found that the sucrose tended to precipitate and produce a cloudy product unsuitable for subsequent urethane foam production. This is believed to be due to preferential chain extension of the oxyalkylene radicals rather than reaction with all the sucrose molecules. Although it is not within the preferred practice of this invention, it is to be noted that the reaction of the sucrose-ethylene diamine mixture with an alkylene oxide may also be catalyzed with a tertiary amine catalyst, such as tetramethylbutanediamine, diethylmethylamine, triethylamine, and the like. Such tertiary amine catalysts, however, tend to give products having greater color, the catalyst is completely removed with difficulty, and water is generally required to initiate reaction at low temperatures. Certain common tertiary amine catalysts also are known to favor the reaction of one, and only one, mole of alkylene oxide with each hydroxyl group present. This reduces flexibility in obtaining molecular weight and hydroxyl number variation. This, therefore, necessitates a stripping operation to remove excess alkylene oxide and water. Further, tertiary amine catalyst contamination of the polyol can cause formulation problems with the polyurethane foam system.

The final step in preparing the cross-linking polyol is to react the sucrose-ethylene diamine and catalyst mixture with at least one mole of an alkylene oxide per reactive hydrogen equivalent in the sucrose and ethylene diamine mixture. The reaction is carried under substantially anhydrous conditions, generally under a blanket of nitrogen, and at atmospheric or superatmospheric pressure. The reaction is generally carried out by adding the alkylene oxide to the above catalyzed reaction mixture over a period of about 2 to 40 hours while maintaining the reaction temperature at about 80° to 140° C., perferably 100° to 120° C., and at about autogenous pressure. The preferred alkylene oxides are propylene oxide and ethylene oxide. The number of moles of alkylene oxide reacted is determinative of the final molecular weight of the cross-linking polyol product. The final molecular weight, equivalent weight, and hydroxyl number of the polyol produced may thus be regulated, as desired, by the amount of alkylene oxide added. It is within the contemplation of this invention to add more than one alkylene oxide. In some instances it may be desirable to utilize mixtures of these alkylene oxides or they may be reacted sequentially. Thus, a block, random, and the like, alkylene oxide condensation reaction is contemplated.

According to the present invention, the foregoing cross-linking polyol composition may be reacted with a suitable organic isocyanate to prepare novel polyurethane compositions. By providing a catalyst, surface-active agent, and a blowing solvent, having a boiling point sufficiently low to enable vaporization thereof by the heat of reaction, the polyurethane product can be obtained as a foam useful for insulation and the like.

In the "one-shot" procedure for producing polyurethane foam, all of the reactants are mixed together at once. In the more conventional "premix" type of "one-shot" procedure, the reactants are divided into two components, the polyisocyanate being separated from the polyol and other ingredients until the actual mixing.

Whether using the one-shot or premix, the combined reactants after initial mixing, with or without external cooling or heating as desired, are poured into a mold, such as a refrigerator wall cavity, and allowed to rise freely to full height, usually over a period of several minutes. During or shortly after the mixing of reactants, the temperature of the reaction mixture rises above the boiling point of the blowing solvent, whereby the thus-forming polyurethane expands under the pressure of the entrapped gas, and, upon setting, produces a rigid polyurethane foam of exceptionally fine texture. External heat may be applied if necessary. Thus, with a higher-boiling solvent, the reaction mixture may be heated, as in an oven, to cause vaporization thereof. The foams are usually aged or conditioned for a period, e.g., one week at 75 degrees Fahrenheit and 50% relative humidity, at the end of which time essentially all of their ultimate compressive strength is attained. Even after extended aging, e.g., eight weeks at 158° Fahrenheit and 100% relative humidity, the foams produced according to the present invention even with their low core and over-all density show remarkable retention of their desirable compressive strength and low K factor properties as well as good dimensional stability.

The foaming formulations for producing foam in accordance with this invention are characterized by low viscosity with superior flow characteristics allowing it to flow to all corners of the mold, such as a refrigerator wall cavity, rise quickly to fill all corners and voids of such a cavity and cure rapidly.

The foams produced according to this invention have a high-closed cell content, low water absorption, and excellent insulation properties.

The following discussion relates in greater detail to the reactants and their characteristics, as well as further additional particulars of the invention.

Any of a wide variety of organic polyisocyanates (c) may be employed in the reaction, including aromatic, aliphatic and cycloaliphatic diisocyanates and combinations of these types. Representative compound include aromatic diisocyanates, such as tolylene diisocyanate and m-phenylene diisocyanate. Aliphatic compounds such as ethylene diisocyanate, ethylidene diisocyanate, propylene-1,2-diisocyanate, butylene-1,3-diisocyanate, tetramethylene diisocyanate, hexamethylene diisocyanate and decamethylene diisocyanate, and alicyclic compounds such as 1,2- and 1,4-cyclohexylene diisocyanates and 4,4'-methylene-bis (cyclohexylisocyanate) are also operable. Arylene diisocyanates, i.e., those in which each of the two isocyanate groups is attached directly to an aromatic ring, react more rapidly with the polymeric glycols or polyols than do the alkylene diisocyanates. The diisocyanates may contain other substituents, although those which are free from reactive groups other than the two isocyanate groups are oridinarily preferred. In the case of the aromatic compounds the isocyanate groups may be attached either to the same or to different rings. Dimers of the monomeric diisocyanates and di(isocyanatoaryl) ureas such as di(3-isocyanato-4-methylphenyl)urea may be used. Additional polyisocyanates which may be employed, for example, include: crude tolylene diisocyanate, p,p'-diphenylmethane diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 4-chloro-1,3-phenylene diisocyanate, 3,3'-dichloro-4,4'-biphenylene diisocyanate, triphenylmethane triisocyanate, and 1,5-naphthalene diisocyanate, and other polyisocyanates in a blocked or semi-inactive form such as the bis-phenylcarbamates of tolylene diisocyanate, p,p'-diphenylmethane diisocyanate, p-phenylene diisocyanate, and 1,5-naphthalene and 1,5-tetrahydronaphthalene diisocyanates.

A wetting agent or surface-active agent is generally necessary for production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface active agents prepared by the sequential addition of propylene oxide and then ethylene oxide to propylene glycol such as those commercially available under the trademark Pluronic, and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The quantity of surfactant or wetting agent in the reaction mixture is also of significance, although this will vary somewhat depending upon the efficiency of the wetting agent. Generally, from about 0.05 to about 2.0% of surface-active agent by weight of total reactants is adequate. Below the lower amounts, the foams have a tendency toward large and uneven cell structure, while more than about 2.0% does not improve foam properties and appears somewhat to decrease foam strength. An optimum appears to be about 0.5% by weight, especially when employing the preferred wetting agents.

The surfactant or wetting agent may in practice be added either to the polyol or isocyanate component without apparent difference in result.

The blowing solvent should be one which is inert to all but soluble or dispersible in at least one of the reactants and insoluble in the final polyurethane foam. The higher the solubility in the reactant or reactants, the lower may be the boiling point of the solvent, which in any case should have a boiling point at one atmosphere of pressure not lower than about −22 degrees Fahrenheit nor higher than about +210 degrees Fahrenheit, preferably not higher than about +120 degrees Fahrenheit, so that it will be vaporized during the polymerization reaction. In general, the halogenated alkane, as well as any other solvent employed either in addition thereto or in place thereof, should be readily liquefied and of sufficient solubility in the reactant or reactants so that its vapor pressure is considerably reduced to avoid the necessity of utilizing expensive high pressure apparatus. If the gas is relatively insoluble, it should be of such a nature so as to be readily dispersible. Foam expansion will occur when the gas is released by attainment of a temperature well above its boiling point, and this can, of course, be controlled considerably by removal or non-removal of the exothermic heat. In cases where the heat of reaction is not sufficient to vaporize the solvent employed, external heating will be required.

The halogenated alkanes possess all of the necessary characteristics and are particularly well adapted to be used as blowing solvents with facility. Fluorotrichloromethane, having a boiling point of about 75 degrees Fahrenheit has been found especially suitable as the blowing solvent, and has the advantage, as do many of the halogenated alkanes of the "Freon" or "Genetron" type, of solubility in or compatibility with the polyol or isocyanate component. Representative blowing solvents, including the preferred halogenated alkane solvents, and their boiling points at one atmosphere of pressure are shown in the following Table I.

TABLE I.—REPRESENTATIVE BLOWING SOLVENTS

| Formula | Name or trade name | Mol. wt. | B.P., °F. |
|---|---|---|---|
| $CCl_2F_2$ | Freon [1] 12 | 120.9 | −21.6 |
| $CH_3—CHF_2$ | 1,1-difluoroethane | 66.1 | −11.2 |
| $C_4F_8$(cyclic) | Freon C-318 | 200 | 21.1 |
| $CClF_2—CClF_2$ | Freon 114 | 170.9 | 38.4 |
| $CHCl_2F$ | Freon 21 | 102.9 | 48.1 |
| $CCl_3F$ | Freon 11 | 137.4 | 74.8 |
| $CBrF_2—CBrF_2$ | Freon 114B2 | 259.9 | 117.5 |
| $CCl_2F—CClF_2$ | Freon 113 | 187.4 | 117.6 |
| $CH_2Cl_2$ | Methylene chloride | 83 | 104 |
| $CCl_4$ | Carbon tetrachloride | 153 | 168 |
| | Isobutane | 58 | 14 |
| | Butane | 58 | 32 |
| | n-Pentane | 72 | 97 |
| | Isopentane | 72 | 82 |
| | Neopentane | 72 | 48 |
| | n-Hexane | 86 | 156 |
| | 2,2-dimethylbutane | 86 | 120 |
| | Heptanes | 100 | 174.2–209 |

[1] Also corresponding "Genetrons."

In practice, the liquefied halogenated alkane and/or other solvent are admixed with the selected reactant or reaction component prior to admixing with the other reactants or reaction component. The outer limits of blowing solvent appear to be from about 1 to about 40 percent, preferably 18 to about 23 percent, based on total weight of reactants and, by varying the amount of solvent together with other minor variations in formulation, foams having densities of from one to twenty pounds or more per cubic foot may be produced. However, it should be noted that foams below about 1.2 pounds per cubic foot density have a tendency to shrink when surface skin is cut off of the body of the foam.

Preferred catalysts are triethylene diamine, also called diazobicyclo-(2,2,2)-octane, and methyl triethylene diamine. Other catalysts, such as stannous octate, may also be used. The quantity of catalyst employed is generally dependent upon its activity and/or the temperature of the reactants prior to mixing. Obviously, higher reactant temperatures require smaller amounts of catalyst. In general, quantities between about 0.5 to 2.0 weight percent of catalyst based on total weight of polyol component in the foamable mixture can be used, preferably between about 0.7 and 1.0 weight percent. The catalysts used in the present invention are commercially available materials. The catalysts as commercially obtained are substantially anhydrous stable materials. If desired, however, additional water may be removed by conventional procedures as by vacuum stripping.

It is to be noted that, according to conventional practice in the art, various fillers and flame retardants, and the like, such as carbon black, magnesium carbonate, calcium carbonate, ammonium phosphate, and so on, may be incorporated into the foams of the present invention if desired. These materials are, however, productive of a higher open cell content and diminution of strength characteristics of the foams embodying the same, so it is to be understood that while a particular foam application may require such additaments and while the foam so constituted may still retain much of its superior quality, for greatest strength, closed cell content, and stability, the incorporation of such materials is not recommended.

The invention is further illustrated but not limited by the following examples in which the parts and percentages given are by weight. The molecular weights of the polyols are calculated from their hydroxyl numbers according to the formula:

$$\text{Molecular weight} = \frac{56.1 \times 1000 \times \text{number of hydroxyl groups}}{\text{hydroxyl number}}$$

The hydroxyl number may be determined according to either the "Phenyl Isocyanate Method for Hydroxyl Determination," as described by Reed, D. H. et al. Anal. Chem., 35, pp. 571–73, April 1963, or the "Phthalic Anhydride Method," described in ASTM designation D1638.

EXAMPLE I

Into a clean, dry reaction vessel equipped with a means for stirring, temperature control, and maintaining a nitrogen atmosphere were placed 459 grams (1.34 moles) of sucrose, 182 grams (3.03 moles) of ethylene diamine and 2.0 grams of sodium hydroxide catalyst. The mixture was preheated with stirring to 110° C., the reaction vessel vented to 0 p.s.i.g., sealed, and 2,160 grams (37.2 moles) of propylene oxide was added over a period of 12 hours. During this period, the pressure, which was maintained by the propylene oxide addition, was from about 40 to 80 p.s.i.g. and the temperature was maintained at about 110° C. Upon completion of the propylene oxide addition, the reaction mixture was digested for about 5 hours at about 130° C. At the end of the digestion period the temperature was reduced to about 31° C. and the product was discharged from the reaction vessel. The product was then stripped of volatiles at a temperature of about 125° C. and at about 2 mm. of mercury pressure, and finally neutralized with 85% phosphoric acid. The sucrose-ethylene diamine polyol produced had the following properties:

Calculated hydroxyl functionality _____ 5.2
Molecular weight _____ 631
Viscosity, cps. at 110° C. _____ 30
Hydroxyl number _____ 464

EXAMPLE II

Into a clean, dry reaction vessel equipped with a means for stirring, temperature control, and maintaining a nitrogen atmosphere were placed 574 grams (1.6 moles) of sucrose, 152 grams (2.5 moles) of ethylene diamine and 2.5 grams of sodium hydroxide catalyst. The mixture was preheated with stirring to 110° C., the reaction vessel vented to 0 p.s.i.g., sealed, and 2,074 grams (35.7 moles) of propylene oxide was added over a period of 12 hours. During this period, the pressure, which was maintained by the propylene oxide addition, was from about 40 to 80 p.s.i.g. and the temperature was maintained at about 110° C. Upon completion of the propylene oxide addition, the reaction mixture was digested for about 5 hours at about 130° C. At the end of the digestion period the temperature was reduced to about 30° C. and the product was discharged from the reaction vessel. The product was then stripped of volatiles at a temperature of about 125° C. and at about 2 mm. of mercury pressure, and finally neutralized with 85% phosphoric acid. The sucrose-ethylene diamine polyol produced had the following properties:

Calculated hydroxyl functionality _____ 5.6
Molecular weight _____ 643
Viscosity, cps. at 110° C. _____ 70
Hydroxyl number _____ 489

EXAMPLE III

Into a clean, dry reaction vessel equipped wtih a means for stirring, temperature control, and maintaining a nitrogen atmosphere were placed 499 grams (1.46 moles) of sucrose, 198 grams (3.25 moles) of ethylene diamine and 2.18 grams of sodium hydroxide catalyst. The mixture was preheated with stirring to 110° C., the reaction vessel vented to 0 p.s.i.g., sealed, and 2110 grams (36.4 moles) of propylene oxide was added over a period of 12 hours. During this period, the pressure, which was maintained by the propylene oxide addition, was from about 40 to 80 p.s.i.g. and the temperature was maintained at about 110° C. Upon completion of the propylene oxide addition, the reaction mixture was digested for about 5 hours at about 130° C. At the end of the digestion period the temperature was reduced to about 30° C. and the product was discharged from the reaction vessel. The product was then stripped of volatiles at a temperature of about 125° C. and at about 2 mm. of mercury pressure. The sucrose-ethylene diamine polyol produced had the following properties:

Calculated hydroxyl functionality _____ 5.25
Molecular weight _____ 587
Hydroxyl number _____ 502

EXAMPLE IV 100 parts of the sucrose-ethylene diamine polyol prepared in Example I above, having a hydroxyl number of 464, 46.7 parts of trichlorofluoromethane, 1.5 parts of a liquid organosilicone surface-active agent, 1.0 part of dimethylaminoethanol, and 0.9 part of triethylene diamine were mixed together to form component A which was mixed with component B, 98.3 parts of commercially available crude toluene diisocyanate, and the combined mixture further mixed in a conventional foam machine and poured into cardboard boxes and allowed to rise in a vertical direction to its full height. The cellular polyurethane structure produced had the following properties:

Density, p.c.f. _____ 1.39
Yield strength, p.s.i.:
   75° F. _____ 26.5
   150° F. _____ 23.4
   200° F. _____ 19.0
Closed cells, percent _____ 87
K factor:
   Initial _____ 0.107
   10 days at 140° F. _____ 0.126
Dry heat aging 1 day at 200° F., percent volume increase _____ 3.3
Humid aging 1 day at 100° F.—100% R.H., percent volume increase _____ 1.3

EXAMPLE V 100 parts of the sucrose-ethylene diamine polyol prepared in Example II above, having a hydroxyl number of 489, 47.3 parts of trichlorofluoromethane, 1.5 parts of a liquid organo-silicone surface-active agent, 1.0 part of dimethylaminoethanol, and 0.9 part of triethylene diamine were mixed together to form component A which was mixed with component B, 102.3 parts of commercially available crude toluene diisocyanate, and the combined mixture further mixed in a conventional foam machine and poured into cardboard boxes and allowed to rise in a vertical direction to its full height. The cellular polyurethane structure produced had the following properties:

| | |
|---|---|
| Density, p.c.f. | 1.39 |
| Yield strength, p.s.i.: | |
| 75° F. | 25.9 |
| 150° F. | 24.9 |
| 200° F. | 21.7 |
| Closed cells, percent | 86 |
| K factor: | |
| Initial | 0.114 |
| 10 days at 140° F. | 0.123 |
| Dry heat aging 1 day at 200° F., percent volume increase | 1.6 |
| Humid aging 1 day at 100° F.—100% R.H., percent volume increase | 1.2 |

As seen from Examples I–III, the hydroxyl functionality, equivalent weight and molecular weight of the cross-linking polyols may be varied as desired. The viscosity of the products are such that they may be readily used in preparing polyurethane foam systems. The polyols are seen in Examples IV and V to be compatible with fluorocarbon blowing agents and they may therefore be conveniently mixed with these agents for easy handling. Examples IV and V show the excellent dimensional stability, density strength, and the like properties of the novel polyurethane foams produced with the cross-linking polyols of this invention. The sucrose-ethylene diamine polyols may therefore be advantageously used in the preparation of a wide variety of foamed, frothed, molded, and the like cellular polyurethane products.

EXAMPLES VI–XI

Six polyol preparations were made following the procedure of Example I with the exception that the weight percent of the NaOH catalyst was varied.

| Example | NaOH, wt. percent | Volatiles in reaction mixture (percent) | Viscosity cps. at 110° C. | Hydroxyl number | Sucrose precipitate in grams |
|---|---|---|---|---|---|
| VI | 0.15 | 7.0 | 45 | 487 | None. |
| VII | 0.20 | 1.5 | 60 | 467 | Do. |
| VIII | 0.40 | | 50 | 472 | Trace. |
| IX | 0.60 | | | | Do. |
| X | 0.90 | | | | 18.5. |
| XI | 1.0 | | | | 20. |

The above examples illustrate that when the preferred range of 0.15 to 0.6 weight percent of caustic catalyst is utilized in the process of the invention, sucrose is either completely absent or present in unobjectionable trace amounts. These homogeneous polyols have average molecular weights, as evidenced by the hydroxyl numbers, and viscosities which render them amenable to production of urethane foams having desirable physical properties. Also, since said polyols are homogeneous, the urethane foams resulting from a series of production runs in which any given polyol is utilized, have reproducible properties. The polyols, because of their low viscosity as compared to prior art materials, do not interfere with production operation and equipment by clogging conduits and pumps which is characteristic of high viscosity material. When the catalyst is employed in greater concentration than the preferred amount of 0.60 weight percent as in Examples X and XI, substantial amounts of sucrose precipitate from the polyol product. The precipitates may be filtered to facilitate subsequent utilization in foam production but filtration is expensive since some loss of polyol unavoidably occurs and, because of the high viscosity, solvents for the polyol which are required during filtration must be separated from the filtered product. If the polyols are utilized without removal of the sucrose, plugging of production equipment results. Also, such polyols are non-homogeneous and a series of urethane foams produced from any given polyol has non-reproducible physical properties. If the 0.15 weight percent concentration is used suitable polyols are provided but a greater retention of volatiles results. Since it is desirable to maintain the volatiles content at 1% or less, a catalyst concentration of 0.20 weight percent is preferred.

It will thus be observed from Examples VI–XI that the concentration of caustic catalyst is critical in the process of this invention in providing acceptable polyol products and particularly polyols which may subsequently be employed to produce rigid urethane foams having excellent physical properties.

EXAMPLES XII–XVI

Four polyurethane foam compositions were produced by the procedure of Example IV with the exception that the molar ratio of sucrose to ethylene diamine was varied.

| | | Volume variation when— | |
|---|---|---|---|
| Example | Sucrose to ethylene diamine molar ratio | Humid aged at 158° F. and 100% R.H. for 28 days | Dry heat aged for 7 days at 250° F. |
| XII | 1.0/3.5 | 43.7 | 62.9 |
| XIII | 1.0/3.2 | 26.6 | 45.9 |
| XIV | 1.0/3.0 | 22.1 | 29.2 |
| XV | 1.0/2.5 | 16.0 | 13.3 |
| XVI | 1.0/2.0 | 17.4 | 11.6 |

The above examples, XIV–XVI, demonstrate the excellent dimensional stability of urethane foams prepared with polyols of this invention utilizing sucrose to ethylene diamine molar ratios within the preferred range of higher diamine concentration. It will be observed from Examples XII and XIII that when ratios greater than the preferred range of high diamine concentration are employed, the urethane foams produced are not dimensionally stable as exhibited by the large increase in volume during both humid and dry heat aging. The data contained in these above examples is particularly significant regarding dimensional stability as the conditions used in both humid and dry heat aging are typical of severe dimensional test treatment in the urethane foam evaluation art.

As many widely different embodiments of this invention may be made without departing from the spirit and scope thereof, it is understood that this invention is not limited, except as defined in the appended claims.

What is claimed is:

1. A composition which consists essentially of a polyol product having a hydroxyl functionality of about 5 to 6.5, and prepared by the reaction of (1) a mixture of one mole of sucrose and about 0.6 to 3 moles of ethylene diamine with (2) at least one mole of a lower alkylene oxide per reactive hydrogen equivalent in said sucrose and ethylene diamine, in the presence of from about 0.15 to 0.6 weight percent by weight of said mixture of a catalyst selected from the group consisting of sodium hydroxide and potassium hydroxide.

2. The composition of claim 1 wherein said alkylene oxide is propylene oxide.

3. The composition of claim 1 wherein said catalyst is sodium hydroxide.

4. A process of preparing a polyol product having a hydroxyl functionality of about 5 to 6.5, which consists essentially of reacting (1) a mixture of one mole of sucrose and about 0.6 to 3 moles of ethylene diamine with (2) at least one mole of an alkylene oxide per reactive hydrogen equivalent in said sucrose and ethylene diamine, in the presence of from about 0.15 to 0.6 weight percent by weight of said mixture of a catalyst selected from the group consisting of sodium hydroxide and potassium hydroxide.

5. The process of claim 4 wherein said mixture has a molar ratio of sucrose to ethylene diamine of about 1.0/1.0 to 1.0/2.2.

6. The process of claim 4 wherein said hydroxyl functionality is from about 5.2 to 6.0.

7. The process of claim 4 wherein said alkylene oxide is propylene oxide.

8. The process of claim 4 wherein said reaction is conducted at a temperature of about 80° C. to 140° C.

9. The process of claim 4 wherein said catalyst is from about 0.2 to 0.4 weight percent by weight of said mixture.

10. The process of claim 4 wherein said catalyst is sodium hydroxide.

References Cited
UNITED STATES PATENTS

| | | | |
|---|---|---|---|
| 2,917,506 | 12/1959 | Caldwell et al. | 260—209 |
| 3,255,253 | 6/1966 | Kuryla | 260—209 |
| 3,332,934 | 7/1967 | Booth et al. | 260—209 |

LEWIS GOTTS, Primary Examiner

J. R. BROWN, Assistant Examiner

U.S. Cl. X.R.

260—2.5 AQ, 77.5 AQ